United States Patent [19]

Bacehowski et al.

[11] 4,196,088

[45] Apr. 1, 1980

[54] CONNECTION MEMBER

[75] Inventors: David V. Bacehowski, Wildwood; Armand R. Van Baelen, Rolling Meadows, both of Ill.

[73] Assignee: Baxter Travenol Laboratories, Inc., Deerfield, Ill.

[21] Appl. No.: 838,706

[22] Filed: Oct. 3, 1977

[51] Int. Cl.² .................................... B01D 35/02

[52] U.S. Cl. ............................ 210/435; 128/214 B; 128/214 D; 285/131

[58] Field of Search ............... 210/172, 251, 358, 435, 210/445, 453; 128/214 B, 214 D, 274.2, 272, DIG. 24

[56] References Cited

U.S. PATENT DOCUMENTS

| | | | |
|---|---|---|---|
| 2,463,814 | 3/1949 | Skinner | 210/459 X |
| 2,756,206 | 7/1956 | Gobel | 210/445 X |
| 2,765,923 | 10/1956 | Novak | 210/445 |
| 2,986,232 | 5/1961 | Wiley | 210/459 X |
| 3,205,889 | 9/1965 | Alder et al. | 128/214 D X |

*Primary Examiner*—William A. Cuchlinski, Jr.
*Attorney, Agent, or Firm*—Henry W. Collins; Paul C. Flattery; Garrettson Ellis

[57] ABSTRACT

A connection of a tubular member with a flexible plastic container includes an aperture in the wall of the flexible plastic container. The tubular member is positioned adjacent the aperture, with the axis of the tubular member being generally parallel to the plane of the aperture. Lateral apertures are defined in the tubular member in communication with the aperture, and an outer wall sealingly surrounds the portion of the tubular member adjacent the aperture to prevent leakage therefrom.

6 Claims, 7 Drawing Figures

FIG. 1
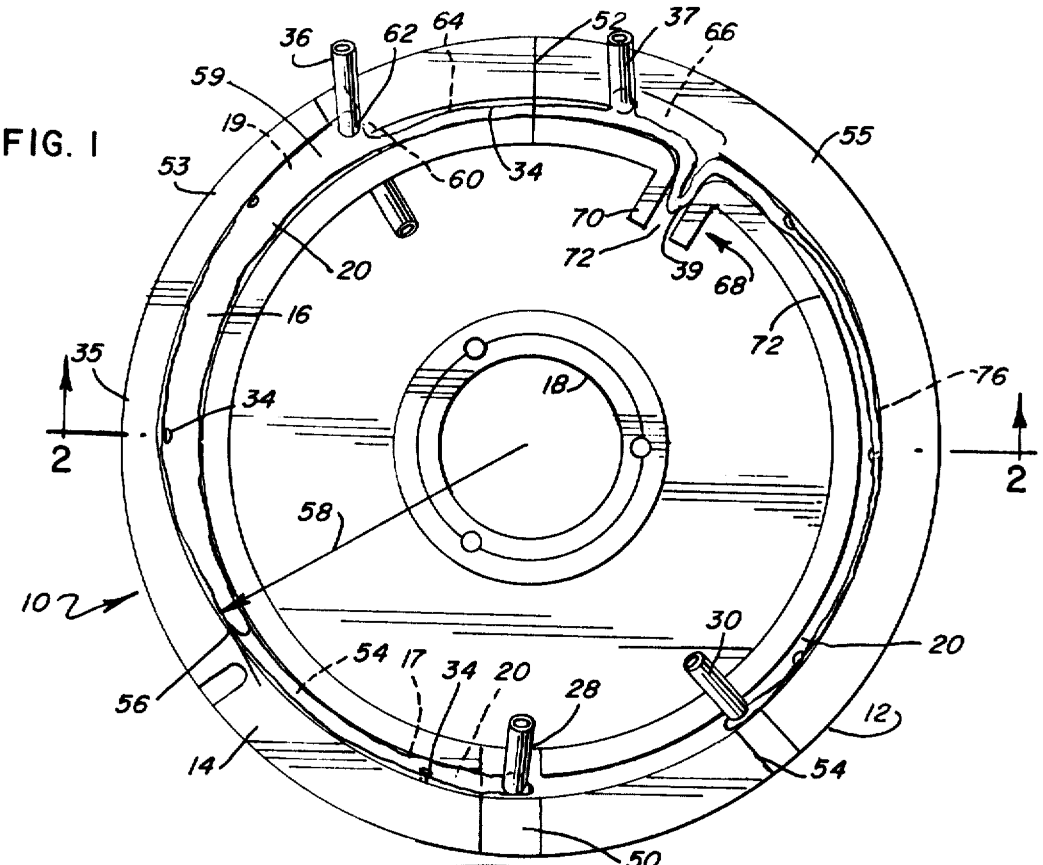
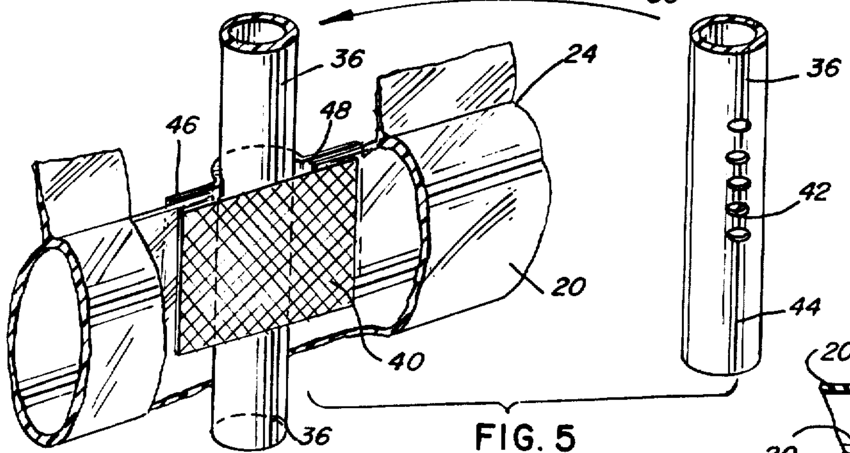
FIG. 5
FIG. 6
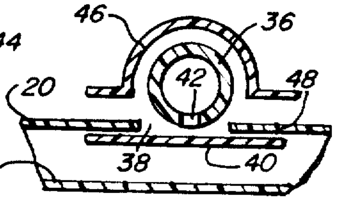
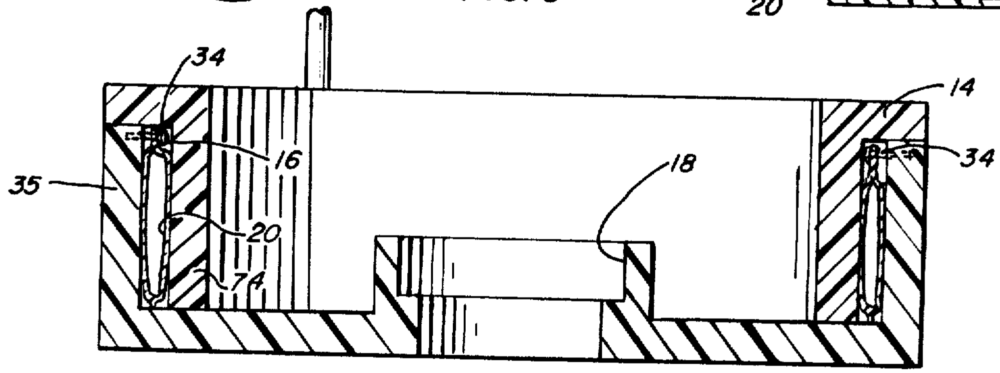
FIG. 2

FIG. 7
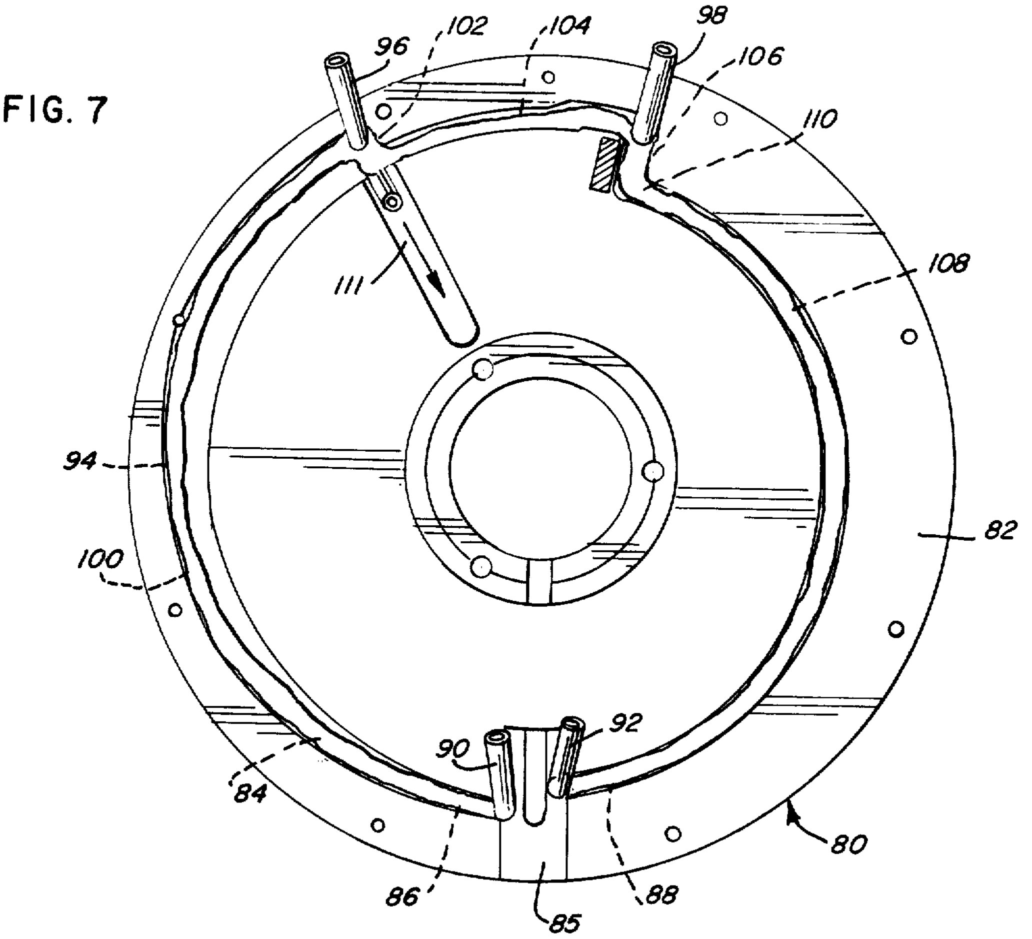
FIG. 4
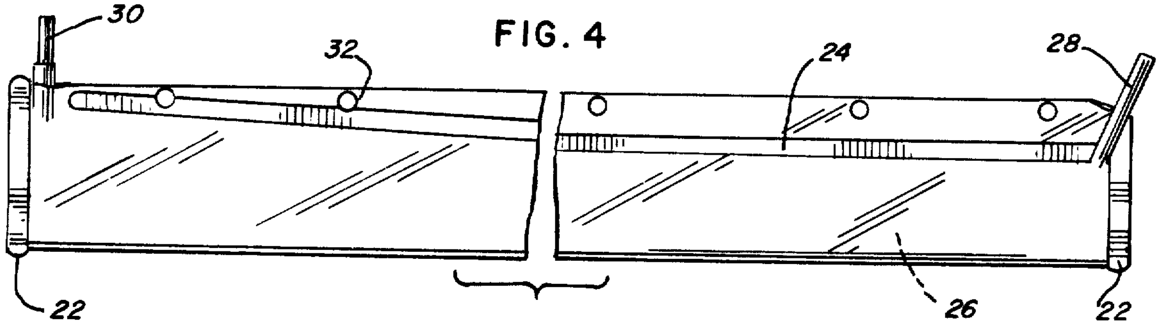
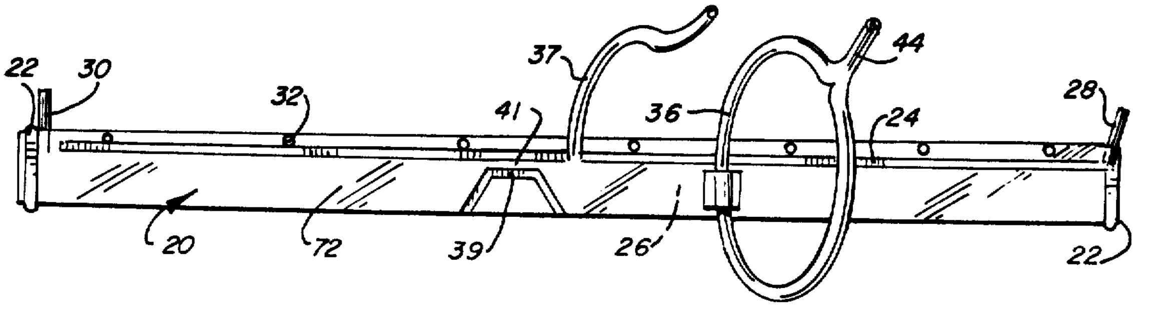
FIG. 3

CONNECTION MEMBER

BACKGROUND OF THE INVENTION

Blood components are separated from units of human blood and utilized for separate therapy in patients. For example, blood plasma may be administered without red cells. Also, the packed red cells can be administered to a patient with a minimum of plasma or other suspending solution. Furthermore, platelets or white cells may be administered as specific components. Also, platelet-poor plasma is another product from blood utilized in various forms of therapy.

This application discloses a centrifuge which can be used to obtain, for example, separate portions of platelets, plasma (including platelet-poor plasma), other white cells, and packed red cells. The device of this invention can operate to process, in a continuous operation, an unlimited amount of blood from a donor, processing the blood to separate and return the red cells to the donor and to harvest, as desired, the white cells, platelets, and plasma.

The centrifuge bowl or container of this invention utilizes a radially-thin, circumferential flow path for the blood and plasma, being processed to provide a long, thin, circumferential flow path in which a continuous process of separation may take place.

A thin, elongated, flexible container or bag is positioned within the circumferential flow path to carry the blood, so that the centrifuge itself does not contact the blood, but instead a disposable container is used.

The advantages of this kind of flow path are further discussed in the patent application Ser. No. 824,182 filed Aug. 8, 1977 of David V. Bacehowski, Herbert M. Cullis and Armand R. VanBaelen, entitled "Blood Component Centrifuge Having Collapsible Inner Liner".

The invention of this application provides improved means for connection between a tubular member and the flexible plastic containers which are placed in the centrifuge as described above, to provide a wide aperture for communication between the tubular member, which may be used as a flow conduit, and the flexible plastic container. Particularly, the connection may be made on the radially outward side of the flexible plastic container when mounted in the centrifuge, so that blood components for other material tending to migrate outwardly pass easily through a large aperture from the flexible container into the tubular member for improved collection of blood components or the like.

It is also contemplated that this connection can be used in other contexts, wherever a tubular member is desired to communicate with a flexible plastic container.

DESCRIPTION OF THE INVENTION

In accordance with this invention, a connection of a tubular member with a flexible plastic container is provided by an aperture in the wall of the flexible plastic container, the tubular member being positioned adjacent the aperture with the axis of the tubular member being generally parallel to the plane of the aperture. Lateral apertures are defined in the tubular member in communication with the aperture of the container. An outer wall sealingly surrounds the portion of the tubular member adjacent the aperture, to prevent leakage therefrom.

Preferably, a screen member is positioned across the aperture to serve as a filter and/or a support to maintain the geometry of the aperture.

As specifically shown in the drawings, the connection is positioned at an intermediate portion of the tubular member, but the connection may also be made at an end of the tubular member, if desired.

The elongated container of this invention may be made from a single folded sheet of plastic such as polyvinyl chloride plastic, heat sealed at the ends and the side.

Access tubing may be positioned at the ends of the elongated container.

The invention of this application may be utilized selectively as desired with any or all of the access tubes, for the passage of blood components through the slot within the container. Also, additional access tubing may communicate with the elongated, flat container between the ends thereof for collection of centrifuged heavier components such as red and white blood cells.

In one embodiment, the container bowl of this invention may process blood plasma to remove platelets which, upon centrifugation, collect on the outer wall. Alternatively, the bowl of this invention may be used to process whole blood to collect both red and white blood cells and platelets, with platelet-poor plasma passing out of the end of the bag positioned within the circumferential slot. The bowl may also be used to collect red blood cells alone.

Blood, plasma, or other liquid may be fed to one end of the elongated, flat bag for passage through the bag during centrifugation. The centrifuged liquid is then withdrawn from the other end of the bag, while red and white cells may be removed at various points intermediate along the container as illustrated herein.

The tubing which is connected to the spinning, elongated, flat bag may be connected to a stationary liquid source and a receptacle for processed liquid outside of the centrifuge by the use of a conventional structure making use of the principles of Adams U.S. Pat. No. 3,586,413, Khoja, et al. U.S. Pat. No. 3,986,442, and similar prior art utilizing the feature of preventing the communication tubing from being twisted by means of the precise rotational relationship described in those patents. Accordingly, a conventional centrifuge can be adapted to receive the bowl of this invention, utilizing the rotational principles for the communication tubing described in the above-cited patents, in which one set of ends of the communication tubing is spinning with the centrifuge bowl and the other ends of the tubing are stationary, and connected outside of the centrifuge to a liquid source and a receptacle for processed liquids.

Referring to the drawings, FIG. 1 is a top plan view of an embodiment of the centrifuge bowl of this invention for the collection of both red cells and platelets.

FIG. 2 is a sectional view of the centrifuge bowl of this invention, taken along line 2—2 of FIG. 1.

FIG. 3 is an elevational view of a flexible, elongated, flat container which may be utilized herein.

FIG. 4 is an enlarged, fragmentary elevational view of the container of FIG. 3.

FIG. 5 is a detailed perspective view of an alternate technique for connecting the tubing to the container, with portions broken away.

FIG. 6 is a longitudinal sectional view of the connection illustrated in FIG. 5.

FIG. 7 is a plan view of an alternate embodiment for the centrifuge bowl of this application.

Referring to FIGS. 1 and 2, centrifuge bowl or container 10 is illustrated, comprising a bowl member 12 and a cover 14 which is removable from the bowl member, to define an annular channel or slot 16 between cover 14 and bowl 10 as shown in FIG. 2. Typically, channel 16 may be 50 mm. high, tapering from about 3.5 to 4.5 mm. (preferably 4 mm.) in width at point 17 to about 12 mm. in width at point 19, and then narrowing again. Overall, channel 16 may be about 28 inches in circumference.

Bowl assembly 12 defines a central aperture-defining sleeve 18, to permit attachment of the bowl to a centrifuge rotor for spinning of the bowl 10.

Referring to FIG. 3, a flexible, elongated flat container or bag 20 for placing in annular chamber 16 is disclosed. Container or bag 20 may be made out of a single piece of plastic, folded into U-shaped cross section at the bottom, and sealed with R.F. (Radio Frequency) seals 22 at the ends thereof, or by any other desired sealing technique. Also, an upper R.F. seal 24 is provided to seal an interior portion 26 of the container in sterile manner from the exterior.

Tubings 28, 30 are provided at each end of the flexible, flat container or bag to serve as an inlet and an outlet, tubing 28 being typically used as the inlet and 30 as the outlet. Heat seal 24 may slope upwardly as shown for the purpose of encouraging the downstream migration of air bubbles.

In the unsealed portion of bag 20, a plurality of perforations 32 are provided to fit around pins 34, which project from the annular wall 35 of bowl 12 inwardly to serve as a hanger means for bag or elongated container 20 when it occupies annular aperture 16.

Bag 20 also defines intermediate connection ports 36, 37 which are positioned to communicate with sealed chamber portion 26 of the elongated bag or container. Ports 28, 30, and 37 penetrate the seal 24 in conventional, sealed manner.

Seal 39 defines a constricted portion inside of the interior of bag 26 to divide it into two segments separated by narrow communicating channel 41 as shown in FIG. 3. This permits, after use, the easy sealing and separation of the bag at constricted channel 41 for harvesting of platelets in one segment thereof.

A detailed connection system for communication tubing 36 in the elongated bag or container 20 is shown in FIGS. 5 and 6. There, a fragment of elongated, flat container 20 is shown. Container 20 may be made of thin-walled, tubular plastic material, for example polyvinylchloride, among other materials. An aperture 38 is cut in the side wall of bag **20*a*, and is covered by a filter screen 40. The tubing, for example communication tubing 36, (a portion of which is separately shown for clarity in FIG. 5) defines a plurality of perforations 42 in the side. The ends of tube 36 loop together to form in each case a single connecting tube 44**.

Outer wall 46 tightly and sealingly surrounds a portion of tubing 36 which may be R.F. sealed to the wall of tubing 20. In particular, a seal line 48 runs around aperture 38 between outer wall 46, and tube 36 and the wall of bag 20, to provide a seal around aperture 38.

As shown in FIGS. 1 and 2, bag 20 is positioned in annular slot 16, with inlet port 28 projecting outwardly as shown through a space 50 in cover member 14. If desired, cover member 14 may be in two pieces, being separated at both space 50 and at junction 52, to provide a pair of generally semi-circular cover member sections 53, 55.

Bag or elongated container 20 is inserted into annular channel 16 in a clockwise manner, the length of bag 20 being so proportioned that it terminates adjacent the outlet slot 54 in cover member 14, which provides room for the exit of tubing 30. As stated before, pins 34 are placed through perforations 32 of bag 20 to support the bag in the annular slot 16. Bowl member 12 may typically be adapted to rotate in clockwise manner.

In a first segment 54 of annular slot 16, it will be noted that the respective slot-defining walls of bowl assembly 12 and cover 14 are proportioned to cause the slot to spiral outwardly at an angle 56 of about 80 to 85 degrees (specifically 82½ degrees which is preferred for a G field of about 200 to 220 G) from the radius 58 of the circular bowl which intersects the slot at that point. This provides a gradually increasing centrifugal force on the blood or other fluid in annular channel 16 during the centrifugal process as it flows, which causes the red blood cells not only to migrate to the radially-outward wall of elongated bag 20, but also to migrate in a clockwise manner to the end of spiral section 54 of annular channel 16. The resultant change in radius may preferably be about 0.2 to 1 cm., specifically about 0.4 cm.. Typically, the blood in first segment 54 of slot 16 may be subjected to continuously changing G fields as it spirals outwardly by about ten percent of its radius. Generally, this invention may be used to create G fields of about 150 to 1,000 G, to obtain the desired separation and collection of red and white cells at low G fields to avoid the activation of platelets. The optimum angle 56 will change with different G fields.

Alternatively, the angle 56 may be 83 degrees, and the G field is about 285 G at the blood inlet to slot 16.

At the end of spiral section 54, the annular channel 16 defines a radially-inward step 60. Elongated container 20 is so positioned that communication tubing 44 is positioned at step 60, projecting outwardly through aperture 62 in cover 14.

The red cells are retained in the radially-outward pocket defined by step 60, and may be withdrawn from elongated container 20 through tubing 44. Aperture 38 and screen 40 are placed on the radially-outward lateral side of the elongated container, and collect red blood cells with great efficiency from the pocket defined by step 60.

After the inward step 60, annular channel 16 may define a generally circular section 64, which terminates in a pocket 66 defined in the annular wall 35 of bowl 12. On centrifugation, elongated container 20 tends to distend into pocket 66, to provide a collection reservoir for white cells, as well as any red cells that have spilled over from the area defined by step 60. Communication tube 45 may be positioned on bag 20 at this point to withdraw the white cells.

Transverse R. F. seal 39 in elongated container 20 is positioned adjacent inwardly positioned outlet 68, and comprises a pair of upstanding, radially inwardly directed walls 70 and a lateral aperture 72 communicating through the annular upstanding wall 74 of cover member 14.

The portion 72 of container 20 which collects platelets is positioned in a section 76 of annular channel 16, which may define a generally circular arc, containing the downstream end of the container 20 and outlet tube 30. Generally, upon centrifugation, the platelets gently adhere to the outer wall of portion 72 of elongated container 20, and may be resuspended and stored by agitation within the elongated container itself in a known manner until ready for use.

It has been found to be generally desirable for section 76 of the annular channel 16 to be positioned radially inwardly from at least the downstream end of spiral portion 54 of the annular channel, to exert on the platelets a somewhat lower centrifugal force than that which has been found to be optimum for the collection of blood cells. By this means, an optimum centrifugal force (such as 200 to 220 G and preferably no more than 400 G) for blood cells can be utilized, while at the same time the platelets do not pack excessively upon the radially outer wall of container 20.

FIG. 7 is a plan view of a variant of the centrifuge bowl of this invention. As in the previous embodiment, bowl 80 includes a cover 82 which cooperatively defines, with bowl 80, an annular channel 84. Channel 84 may be interrupted by slot 85 in cover 82 to define a beginning portion 86 and an end portion 88. Access tubing 90 and 92 is carried by an elongated collapsible container 94, similar to bag 20 or *20a* and positioned within channel 84. Intermediate access tubings 96 and 98 are also carried by bag 94.

As in the previous embodiment, portion 100 of the annular channel is outwardly spirally-shaped for the same purpose as the previous embodiment, terminating in a step portion 102 to provide a pocket for the entrapment of red cells. Preferably, the same slot configuration is used as in the previous embodiment, to provide the same order of varying G field. The red cells may then be withdrawn through tubing 96.

Second segment 104 of channel 84 then leads to second step 106, which may be larger than the first step 102, and which is for the purpose of collecting white cells and any residual red cells that may have escaped the previous pocket. The white cells may be withdrawn through tubing 98, connected with container 94.

Third segment 108 of the annular channel 84, containing bag 94, then may define a circular arc which is positioned radially-inwardly of the entire red cell separating portion 100 of annular channel 84, to reduce the G field for platelet separation by collection on the outer wall of bag 94, for example a G field of 120 to 125 G.

After cell separation operations are completed, bag 94 is removed, and may be R. F. sealed to close the bag interior and then severed at area 110, for example, for separation of the platelet-containing portion 108 of the bag for storage, if desired.

A short separation bag may also be used, turning into and terminating at slot 111, for the separation only of red cells and plasma. The outlet tubing then leads from a radially-inward portion of bowl 80.

The above has been offered for illustrative purposes only, and is not intended to limit the invention of this application, which is as defined in the claims below.

That which is claimed is:

1. In a connection of a tubular member with a flexible plastic container, an aperture in the wall of said flexible plastic container, said tubular member being positioned adjacent said aperture with the axis of said tubular member being generally parallel to the wall of the flexible plastic container defining said aperture, second apertures defined in the side wall of said tubular member being in communication with said container aperture, and an outer wall sealingly surrounding the portion of said tubular member adjacent said aperture to prevent leakage therefrom.

2. The connection of claim 1 in which a screen member is positioned across said aperture.

3. The connection of claim 2 in which the lateral apertures of said tubular member are positioned at a portion substantially spaced from the ends thereof.

4. The connection of claim 3 in which said flexible plastic container is an elongated, flat bag having sealed ends and a side seal, said side seal defining a slope toward a side of the bag in the direction of one end thereof.

5. The connection of claim 4 in which heat seals define a constricted portion in said elongated bag to facilitate the severing of said bag at said constricted portion.

6. The connection of claim 4 in which said tubular member communicates at both ends with flexible flow tubing which in turn connect with each other at a position remote from said tubular member.

* * * * *